United States Patent [19]

Michael

[11] 4,154,904
[45] May 15, 1979

[54] STORAGE BATTERY ATTACHMENT

[76] Inventor: F. Raymond Michael, 3920 E. Harbor Dr., Bettendorf, Iowa 52722

[21] Appl. No.: 831,882

[22] Filed: Sep. 9, 1977

[51] Int. Cl.² .......................... H01M 2/12; H01M 2/36
[52] U.S. Cl. ........................................... 429/64; 429/76
[58] Field of Search ................ 429/64, 76, 73, 61, 429/72, 80, 78, 77

[56] References Cited

U.S. PATENT DOCUMENTS

| | | | |
|---|---|---|---|
| 1,361,437 | 12/1920 | Blau | 429/64 |
| 1,991,604 | 2/1935 | Drabin | 429/78 |
| 3,708,347 | 1/1973 | Blaich et al. | 429/63 |

FOREIGN PATENT DOCUMENTS 964747  10/1950  France .................... 429/64

*Primary Examiner*—Donald L. Walton
*Attorney, Agent, or Firm*—Shlesinger, Arkwright, Garvey & Dinsmore

[57] ABSTRACT

This invention is an attachment for a standard storage battery attachment providing a liquid reservoir which is in communication with the individual cells of the battery for automatically maintaining a predetermined electrolytic level within the individual cells while simultaneously allowing gas buildup to be released. A valve is located between each cell and the reservoir, which valve opens and closes in response to the electrolytic level within the cell to automatically maintain the electrolyte at a predetermined level. The attachment is provided with a cover having one or more openings for adding liquid to the reservoir.

3 Claims, 10 Drawing Figures

Fig. 5
Fig. 6
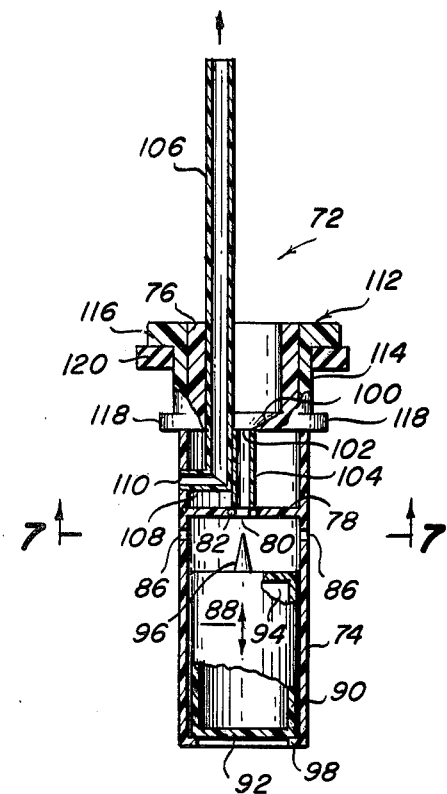
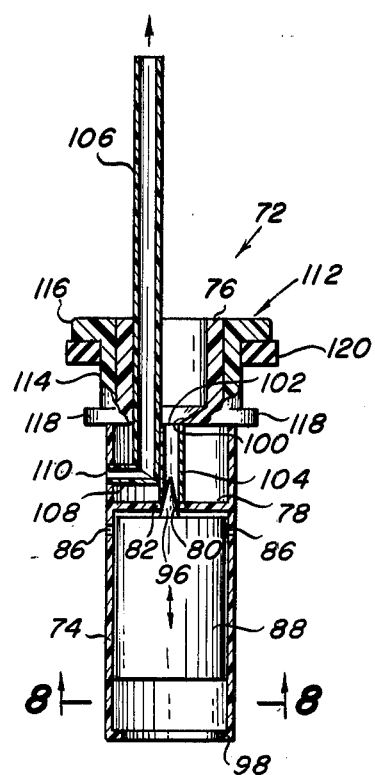
Fig. 7
Fig. 8
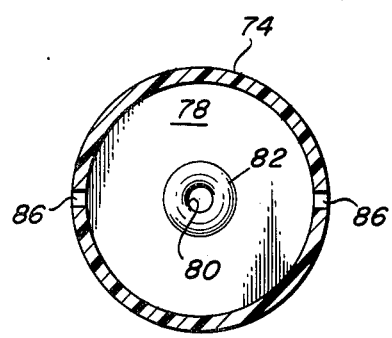
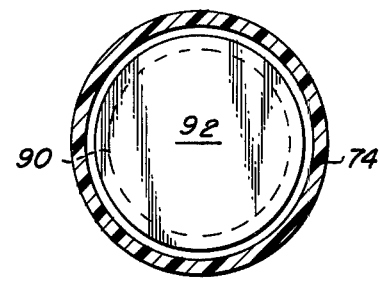

STORAGE BATTERY ATTACHMENT

BACKGROUND OF THE INVENTION

This invention is an attachment for standard storage batteries for automatically and independently maintaining the electrolytic level within the individual cells in the battery and to protect the top of the battery.

Storage batteries presently in use comprise a plurality of cells into which water is periodically added to an opening in each cell, which cells are normally fitted with a removable cap for this purpose. In view of the necessity of adding water to each cell individually, the maintenance of such batteries is time-consuming, and this problem is even more pronounced where a large battery having twelve or more cells is employed. Furthermore, since the water is added to the cell through the top cover of the storage battery, this cover, along with the batteries cables, intercell connectors and junctions between cells must be exposed at all times, with resultant deleterious effects.

As a result of the above-noted maintenance problems with the storage battery, improper watering often occurs, as a result of which a cell or cells may be overfilled resulting in loss of electrolyte and a reduction in potential electrical capacity. Also, where maintenance is not performed timely, there is danger that a cell or cells will be "low" in electrolytic solution for a period of time. Once this occurs, and a portion of the positive or negative plate becomes dry, it will not recover its full capacity, thereby reducing the electrical potential of the battery.

Storage batteries in which the tops thereof are exposed also are subject to the accumulation of foreign material which can result in a shorting of the battery at the intercell connectors. Damage to the battery can occur through accidental engagement with tools or the like resulting in shorting of the battery.

Various attempts have been made to provide water reservoirs for storage batteries including an attachment mounted on top of the conventional storage battery such as illustrated in U.S. Pat. No. 2,141,079. This device, however, requires either a specially built battery or the attachment of a holddown bolt on the battery case for retaining the same in position.

SUMMARY OF THE INVENTION

The present invention is a reservoir attachment for mounting on a conventional storage battery requiring no special means mounted on the battery for effecting securement thereto, the attachment including a single opening for adding water to the reservoir and individual valve means for each cell of the battery to automatically control the flow of water thereto, and to maintain a predetermined level of electrolytic solution in each cell. The present attachment is attached to the storage battery by virtue of fixed engagement of each valve assembly with a flange surrounding each filler opening of the storage battery, which valve assemblies may be readily engaged with, and disengaged from, the storage battery, as needed.

The present storage attachment is within the existing physical limitations of standard batteries and, by virtue of its attachment to the exposed top wall thereof, protects the same from the accumulation of foreign material and physical damage during use.

The present invention further includes a valve assembly wherein a float valve is movable in response to the rise of liquid in the individual cell, which float valve is fully seated when the liquid reaches a predetermined level, to shut off the flow of water from the reservoir into the cell. The valve assembly further includes tube means for conducting gas within the cell to a point above the water level of the reservoir.

DESCRIPTION OF FIGURES OF THE DRAWINGS

FIG. 5 is a longitudinal sectional view of the valve assembly forming a part of the present invention, showing the float valve in inoperative position;

FIG. 6 is a sectional view similar to FIG. 5, showing the float valve in operative position;

FIG. 7 is a sectional view taken along the line 7—7 of FIG. 5, looking in the direction of the arrows;

FIG. 8 is a sectional view taken along the line 8—8 of FIG. 6;

DESCRIPTION OF THE INVENTION

Figure 1:
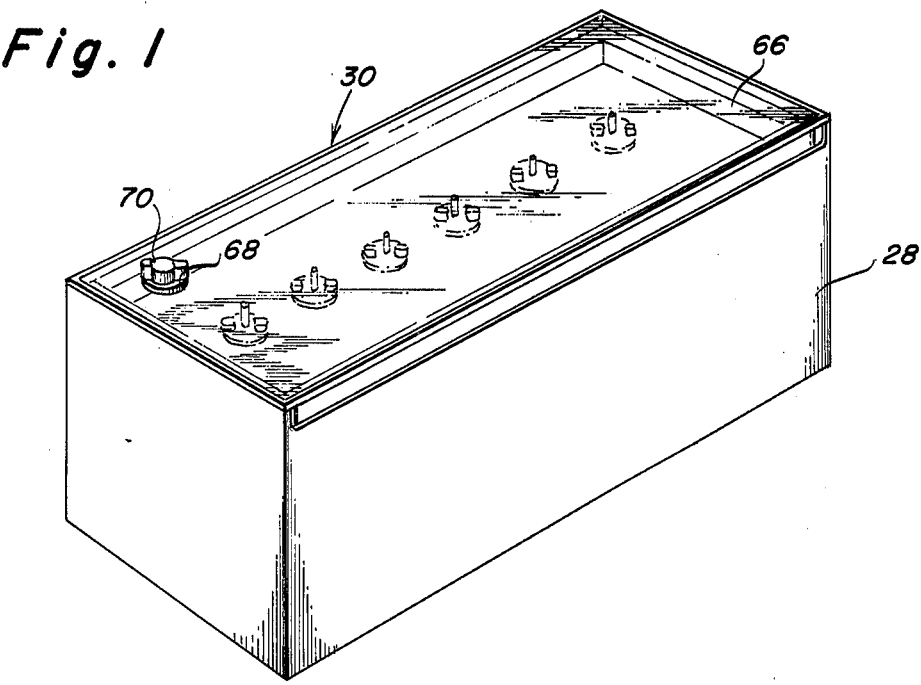
FIG. 1 is a perspective view of the present invention, illustrating its use.
Figure 2:
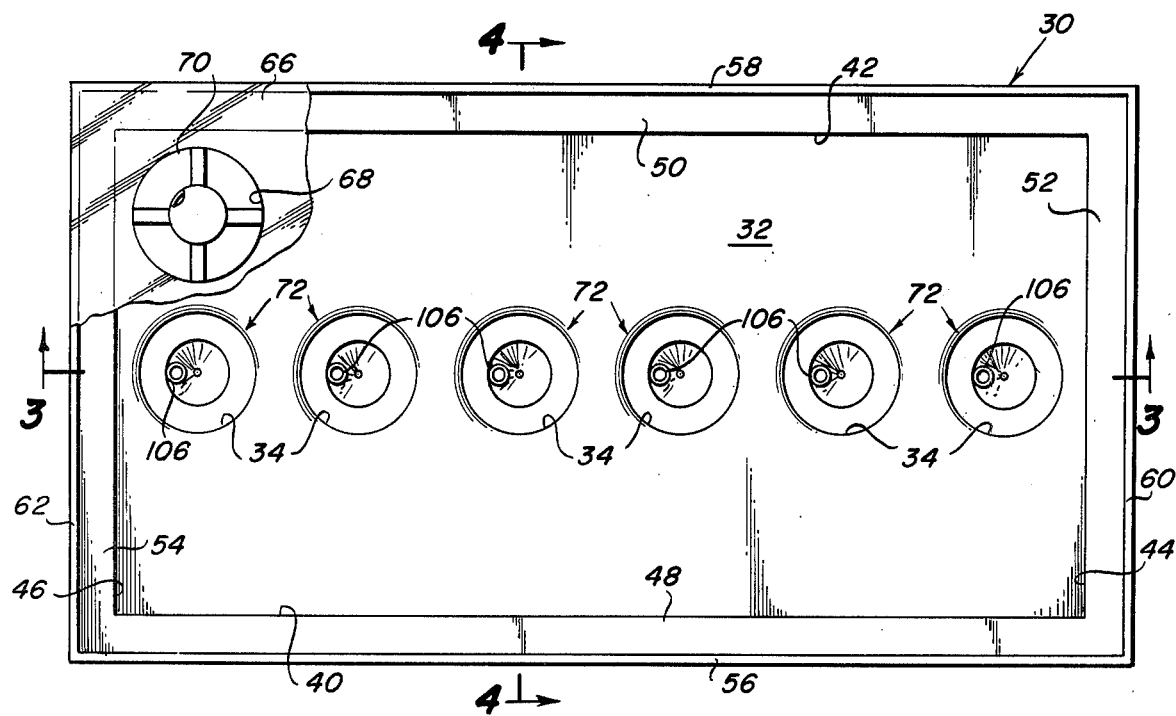
FIG. 2 is a top plan view thereof.

In FIGS. 1 to 4 there is illustrated a conventional storage battery generally designated 20 having a plurality of cells 22 containing lead plates and electrolytic solution, each cell being provided with a flange member 24 surrounding the filler opening having bayonet elements 26. Battery 20 is placed within a standard steel tray designated 28 of boxlike construction with the top thereof removed, the sides of which tray extend above the upper limit of the battery for protecting the same from damage.

In accordance with the present invention, there is provided an attachment generally designated 30 molded of plastic or other suitable material adapted to fit within tray 28 and engageable with portions of the top cover of battery 20 for serving as a water reservoir to be added to each cell individually on demand.

Figure 9:
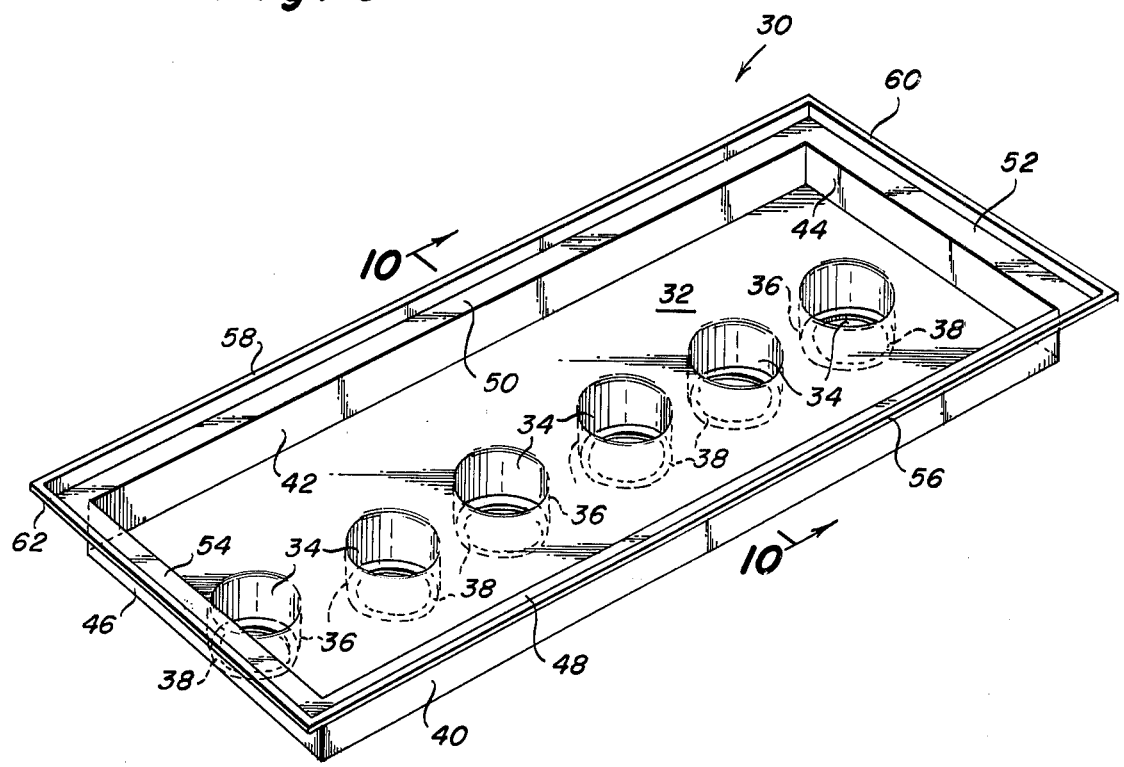
FIG. 9 is a perspective view of the attachment of the present invention.
Figure 10:
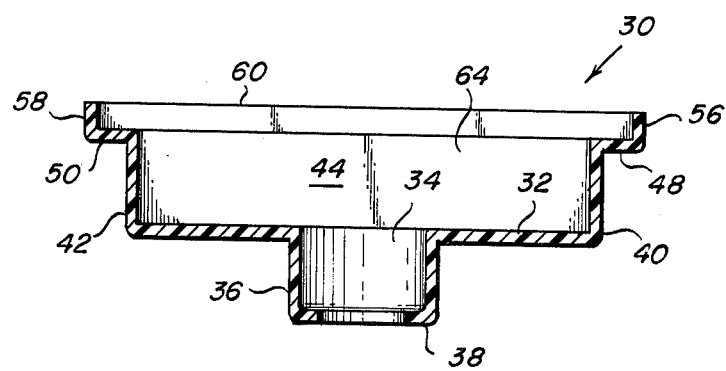
FIG. 10 is a sectional view taken along the line 10—10 of FIG. 9, looking in the direction of the arrows.

As shown in FIGS. 9 and 10, attachment 30 includes an elongated flat body surface 32 in which are located a plurality of wells 34, one for each cell cover fill hole of the storage battery. Each well 34 is formed by a depending peripheral wall 36 extending downwardly from flat body surface 32, the lower end of which wall is provided with an annular wall 38, leaving a central opening to receive flange member 24 which surrounds the filler opening of the storage battery.

The side and end margins of flat body surface 32 issue into upwardly extending vertical walls, the side walls being indicated at 40 and 42 and the end walls at 44 and 46.

The upper limits of the side and end walls in turn issue into outwardly extending flanges which are substantially parallel to the plane of flat body surface 32, the side wall flanges being designated 48 and 50 and the end wall flanges being designated 52 and 54. The outer limit of wall flanges 48, 50, 52 and 54 are bent upwardly to provide side terminals 56 and 58 and end terminals 60 and 62.

Attachment 30 is designed to fit within tray 28 so that the undersides of side and end wall flanges 48, 50, 52 and 54 engage the top edge of the tray periphery and are supported thereby. (See FIGS. 3 and 4). Wells 34 are so located that cell opening flanges 24 extend upwardly therein within annular wall 38, the outer surface of annular walls 38 engaging the top of the battery at points proximate the cell openings, flat body surface 32 lying in spaced relation to the surface of the battery.

The space within attachment 30 between side and end walls 40, 42, 44 and 46 provides a water reservoir 64, the reservoir being closed by a flat protective cover 66 supported by side and end wall flanges 48, 50, 52 and 54. Cover 66 may be of steel construction or, for purposes of visually examining the reservoir, may be of a transparent rigid plastic construction such as Plexiglas. Cover 66 is provided with a single filler opening 68 which is normally closed by a cap 70, which is removable for filling the reservoir in a well-known manner. If desired, a second filler opening and cap may be added to the attachment.

It is a salient feature of the present invention to provide a valve assembly designated 72 located in each well 34 of attachment 30, which assemblies serve to fixedly hold the attachment in position in engagement with the storage battery and to control the flow of water from reservoir 64 into each individual cell 22. Valve assembly 72 is shown to advantage in FIGS. 5 to 8.

Each valve assembly comprises an elongated tubular valve housing 74, to the upper end of which is fitted an extension 76 of tubular construction. A transverse wall 78 extends through valve housing 74 at a point intermediate its length, and is provided with a central opening 80. A sealing member such as an O-ring 82 is mounted in transverse wall 78, proximate opening 80, for purposes which will be hereinafter more fully set out.

Below transverse wall 78, housing 74 is provided with ports 86 through which water from reservoir 64 passes into a battery cell.

A float valve member generally designated 88 is positioned within valve housing 74 and is longitudinally movable with respect thereto. Float valve member 88 includes a tubular body portion 90, the ends of which tubular member are closed by a lower wall 92 and an upper wall 94. The float valve member further includes a cone-shaped valve portion 96 extending upwardly from the outer face of upper wall 94, the pointed extremity of the valve portion being adapted to extend through opening 80 in transverse wall 78 into sealing engagement with O-ring 82 to cut off the flow of liquid from the reservoir to the battery cell when the liquid level in the latter has reached a predetermined height.

The lower end of valve housing 74 is provided with stop members 98 to limit the extent to which float valve member 88 may move downwardly within valve housing 74.

The lower end of valve housing extension 76 is provided with a hopper-like wall portion 100 having a central opening 102 through which liquid gravitates from reservoir 64. A tube 104 extends between wall portion 100 and transverse wall 78 and connects opening 102 to opening 80. This forms a path through which liquid in reservoir 64 flows past cone-shaped valve portion 96 following which it passes through valve housing ports 86 and between float valve member 88 and valve housing 74 into the battery cell.

Figure 3:
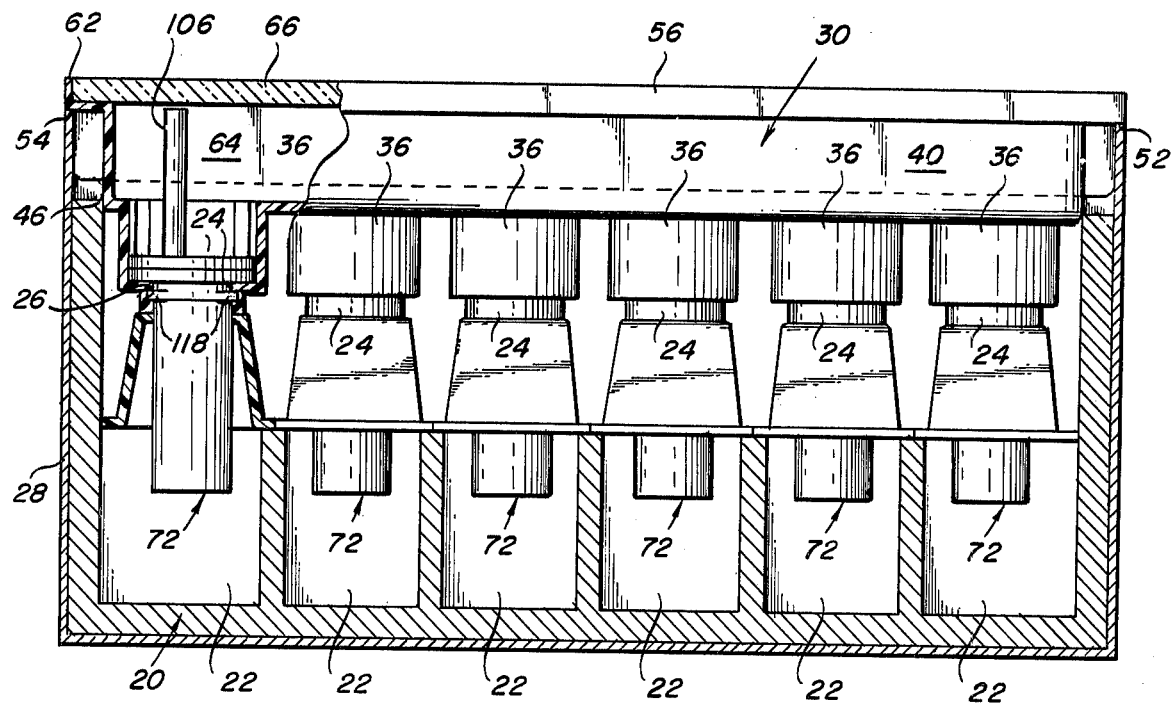
FIG. 3 is a sectional view taken along the line 3—3 of FIG. 2, looking in the direction of the arrows.
Figure 4:
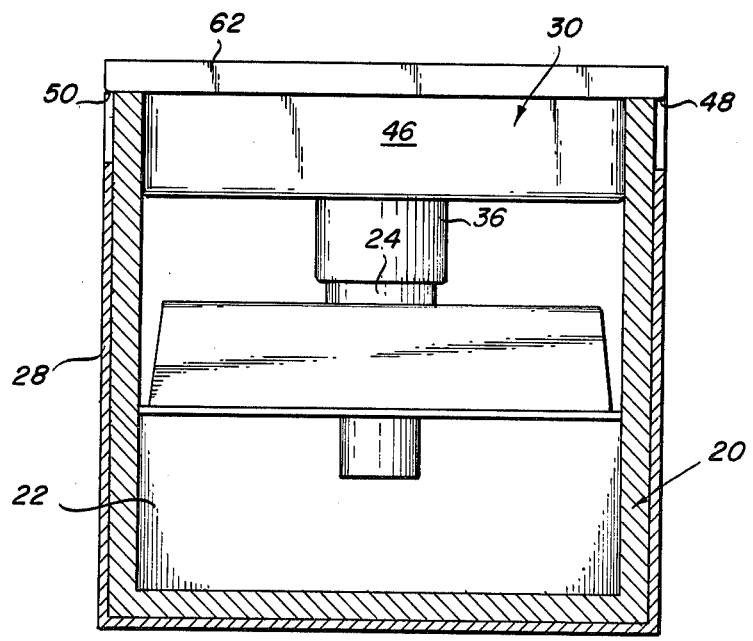
FIG. 4 is a sectional view taken along the line 4—4 of FIG. 2, looking in the direction of the arrows.

A gas vent tube 106 of elongated tubular shape is fixedly engaged within, and extends longitudinally of, valve housing 74 and extension 76. The lower end of vent tube 106 is bent to provide an angular portion 108 which communicates with an opening 110 in the wall of valve housing 74 at a point above transverse wall 80. The upper end of tube 106 extends beyond extension 76 to a point above the liquid level of reservoir 64. As shown in FIG. 3, this arrangement permits gases within each individual cell to be conducted upwardly through opening 110, angular portion 108 and tube 106 to a point above the liquid level of reservoir 64.

In order to secure the valve assembly in position, there is provided a caplike member 112 similar to a conventional cap used to cover battery cell openings, but with the central portion thereof removed. Member 112 includes a tubular body portion 114, the upper end of which is provided with an outwardly extending flange 116. Tubular body portion 114 is adapted to fit snugly over tubular attachment 76 and may be secured thereto in any suitable fashion. The outer periphery of tubular body portion 114 is provided with bayonet elements 118 which are adapted for cooperation with complementary bayonet elements 26 of flange member 24 to secure the valve assembly in position in a well-known manner. A sealing washer is indicated at 120.

OPERATION

In use of the present invention, attachment 30 is placed within tray 28 with the wells 34 thereof engaged over flange member 24 surrounding the filler openings, and with the underside of flanges 48, 50, 52 and 54 engaged with the upper peripheral edge of tray 28.

In order to secure the attachment in position, a valve assembly 72 is inserted through each well 34 and flange member 24, the valve assembly then being twisted to interengage bayonet elements 26 of flange member 24 with bayonet elements 114 of member 108. Water may then be added to reservoir 64 through filler opening 68.

In the event that the electrolyte level in an individual cell is low, float and float valve member 88, which floats on the surface of the electrolyte within the cell, will be in the lowermost or inoperative position shown in FIG. 5. Liquid from reservoir 64 gravitates through well 34, valve housing 74, tube 104, opening 78 and past cone-shaped float valve 96. The water is then free to pass through ports 86 into the cell and through the annular space between float and cone-shaped float valve member 88 and float housing 74.

As the water flows into cell 22, float valve member 88 rises upwardly until cone-shaped valve portion 96 extends through opening 78 into sealing engagement with O-ring 82 as shown in FIG. 6. The flow of water into the cell is therefore stopped when the electrolytic level in the cell reaches a predetermined level, as determined by the relative position of the component parts of the valve assembly within the valve.

By reducing the area of the valve member to a cone-shaped portion, the "head" of liquid in the reservoir will not overcome the flotation of the valve member, and the cone-shaped portion thereof will be free to rise into sealing engagement with O-ring 82 to close the valve.

Since each cell of the battery is provided with its own individual valve assembly, the maintenance of the fluid level in the cells is automatically and individually carried out, so that the electrolytic level is always at a predetermined, optimum height within the cell and preventing overfilling of the individual battery cells.

Consequently, the battery will operate at a maximum efficiency and the life of the battery will be prolonged.

By providing an attachment cover which is transparent, the level of water in the reservoir can be visually determined at a glance, and maintenance of the battery is required less frequently.

The attachment of the present invention is easily installed and removed from conventional batteries and can be implemented within the existing physical limitations of these batteries.

By virtue of the spaced relationship of the main portion of the body of the attachment from the battery surface, electrical shorts between cells is obviated, and the top of the battery is protected from the accumulation of foreign materials from damage.

While the present invention has been shown and described as embodying an attachment for a standard storage battery, it is to be understood that such attachment could be formed integrally with the battery at the time of manufacture. Various other changes could be made within the scope of the appended claims.

What is claimed is:

1. In combination with a storage battery having a plurality of cells containing an electrolytic solution, each of which cells is provided with a filler opening, liquid storage means including:
   a. a panlike member having a body portion forming a liquid reservoir
   b. said body portion having a plurality of openings in communication with the battery filler openings
   c. a valve assembly positioned in each of said body portion openings, a portion of each of said valve assemblies extending into the battery cell
   d. each of said valve assemblies including a tubular member comprising a valve housing
   e. a wall extending transversely of said tubular member intermediate the length thereof
   f. said wall having a central opening for permitting liquid to flow from the liquid reservoir through the opening to the battery cell
   g. a vent tube mounted in said valve housing and extending upwardly from said wall to a point above the surface of the liquid in the reservoir
   h. the periphery of the valve housing tubular member lying within the battery cell being provided with an opening in communication with said vent tube to allow gases in the battery cell to be conducted from the battery cell to a point above the liquid in the reservoir
   i. a float valve member within said valve housing tubular member and movable longitudinally of the latter between said transverse wall and the lower end of the tubular member
   j. said float valve member including a hollow cylindrical body adapted to float within the valve housing on the surface of the electrolytic solution within the valve housing
   k. said hollow cylindrical body being in close, but spaced, relation to the valve housing tubular member to permit liquid to flow therebetween
   l. a portion of said cylindrical body being cone-shaped and extending upwardly to a point for sealing engagement with the central opening of the valve housing transverse wall for cutting off flow of liquid into the cell from the liquid reservoir when the level of the electrolytic solution in the battery cell reaches a predetermined level
   m. said valve housing tubular member being provided with port means below and proximate said transverse wall and lying above said float valve member to permit fluid to flow from the liquid reservoir through the upper portion of the valve housing, the central opening of the transverse wall and the port means into the battery cell, and
   n. means for retaining said valve assembly in engagement with a battery filler opening.

2. The liquid storage means of claim 1, with the addition of
   a. an O-ring in the central opening of the transverse wall which is engaged by the cone-shaped portion of said float valve member.

3. The liquid storage means of claim 1, with the addition of
   a. a sealing member mounted on the outer periphery of the valve housing of each of said valve assemblies and engageable with the body portion of said panlike member proximate the openings of the latter.

* * * * *